United States Patent [19]

Sachot

[11] Patent Number: 4,559,682

[45] Date of Patent: Dec. 24, 1985

[54] MACHINE TOOL WITH SWIVELING HEAD

[75] Inventor: Michel Sachot, Saclay, France

[73] Assignee: Centre d'Etudes du Fraisage, France

[21] Appl. No.: 389,074

[22] Filed: Jun. 16, 1982

[30] Foreign Application Priority Data

Jun. 17, 1981 [FR] France ............................. 81 11914

[51] Int. Cl.⁴ .......................... B23Q 17/00; B23C 9/00
[52] U.S. Cl. .................................. 29/26 A; 74/813 L;
409/211; 409/215; 409/216
[58] Field of Search ............... 29/26 A, 568; 409/215,
409/216, 221, 230, 201, 211; 74/816, 813 L;
408/35

[56] References Cited

U.S. PATENT DOCUMENTS

| | | | |
|---|---|---|---|
| 3,238,615 | 3/1966 | Leone et al. | 29/568 |
| 3,465,615 | 9/1969 | Jones et al. | 74/816 |
| 3,760,652 | 9/1973 | Joyard et al. | 74/813 L |

Primary Examiner—William R. Briggs
Attorney, Agent, or Firm—Darby & Darby

[57] ABSTRACT

A swivel head swivels on its support along a plane face that is perpendicular to the axis of rotation. The face has the shape of a movable disk that slides on a stationary disk. The movable disk is rotated by means that ensure centering with a predetermined clearance. The stationary disk is pierced by two diametrically opposite bores and the movable disk is pierced by at least one pair of diametrically opposite bores with the same diameter and with the same distance between centers, and located at the same distance from the center, within the clearance. The positions of a pair of bores may be generated from those of another pair, by rotation of predetermined angle. The support features means for inserting, across the two disks, two expandable rings, for expanding them, and for retracting them.

24 Claims, 8 Drawing Figures

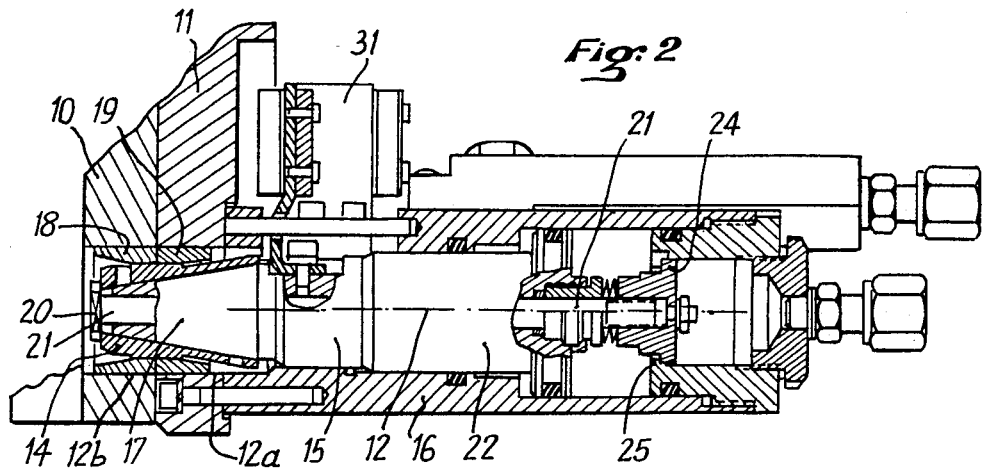
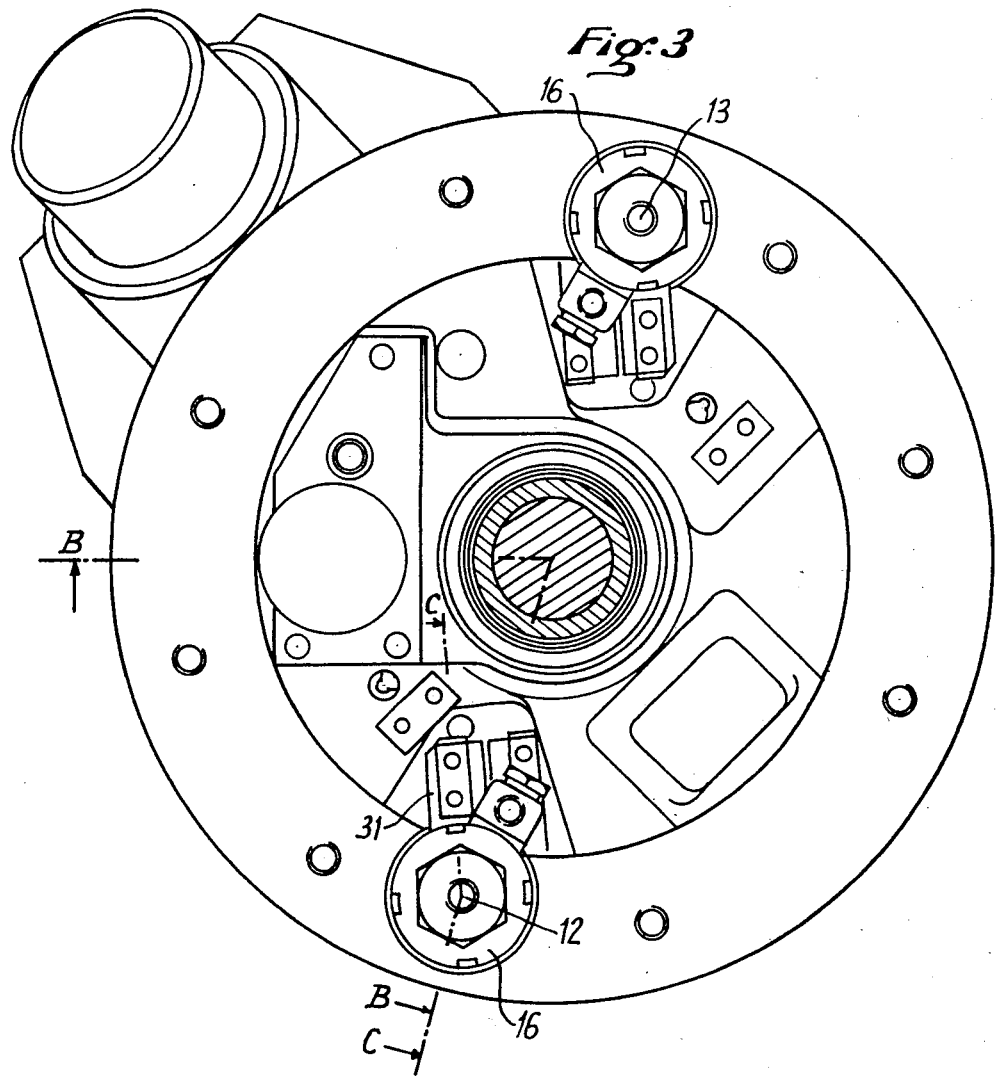

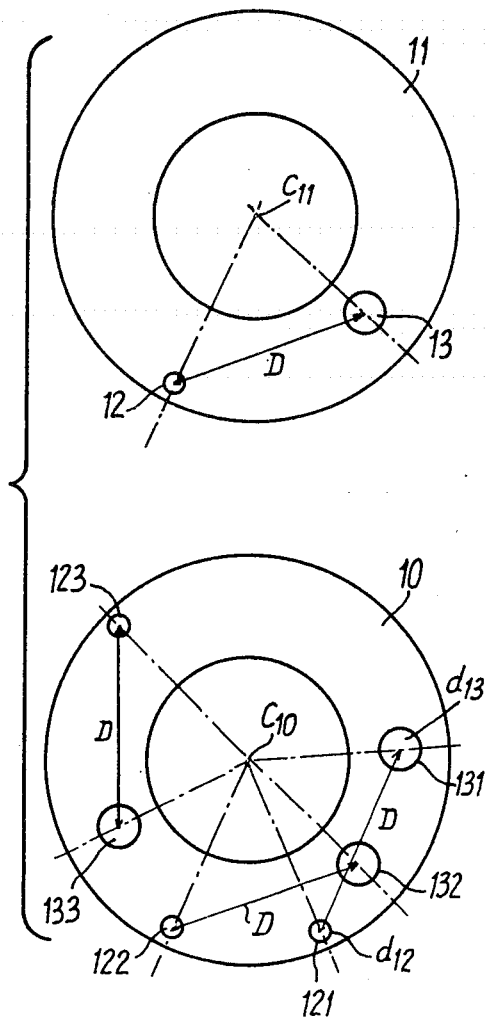
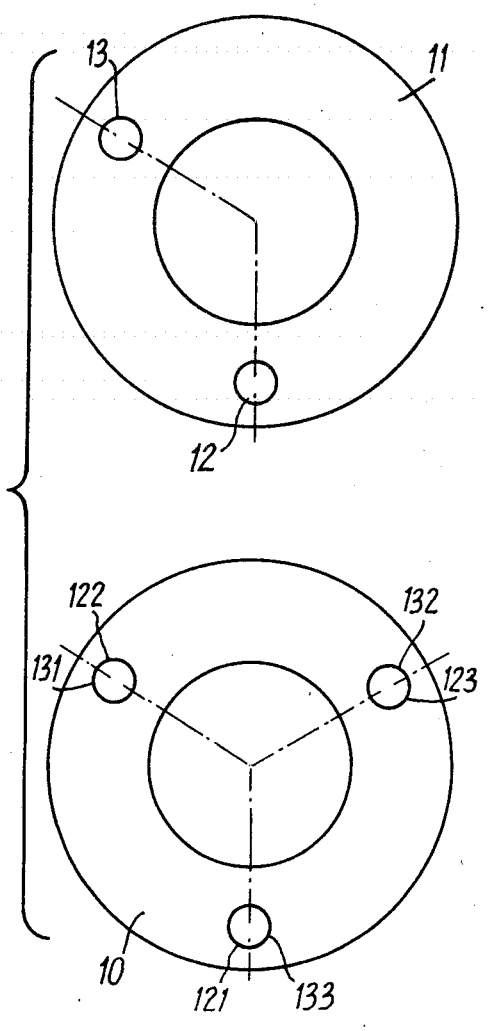
Fig. 7
Fig. 8

MACHINE TOOL WITH SWIVELING HEAD

The invention refers to machine tools that feature a support such as a sliding ram which supports a swiveling spindle-holder head, whose rotation is automatically controlled and which must be locked in a precise manner in at least two positions, such as may correspond, for instance, to a 180° rotation of the head, where one of the positions may be used for the automatic change of the tool.

A head of this type may be single-spindle or multi-spindle. It is known—notably from U.S. Pat. No. 3,238,615—to make a swiveling head that swivels on an axis inclined by 45° in relation to the horizontal working plane of the table, which head is equipped with automatic control of rotation by means of a pinion and ring gear and with means for locking in two positions that correspond to a rotation of 180° of the head, by introducing, under hydraulic control, a finger carried by the support in a seat of the swiveling head and by pressing the swiveling head against its support (carriage or ram).

It is known, on the other hand, that the precision of indexing may be ensured by means of expandable sleeves carried by the indexing finger, which ensure a most perfect coaxiality between the bores of the stationary plate and of the moving plate. Such a device has been described in a patent of the German Federal Republic, No. 24 60 368, in the name of Scharmann & Co.

Nonetheless, the precision of these means is limited by the precision in machining the parts and, in the case of rotating parts, limited by the precision with which the angle of rotation is defined. But, to make modern machines with automatic control, one must achieve greater levels of precision than those that can be attained in this fashion.

The present invention concerns improvements that make it possible to obtain such precision with simple and reliable manufacturing means.

According to the invention, the head swivels on the support along a plane surface that is perpendicular to the axis of rotation, such surface taking the shape of a flat movable disk, integral with the head, that slides on a flat stationary disk, integral with the support. The movable disk, integral with the head, is driven in rotation by means that ensure centering with a predetermined clearance. The stationary disk, integral with the support, is pierced by two bores. The movable disk, integral with the head, is pierced by at least a pair of corresponding bores. The two bores in each such pair have precisely the same diameter and the same center-to-center separation as the bores of the stationary disk, as well as—within the limits of the predetermined clearance that was provided—the same distance from the center of the disk as those of the bores of the stationary disk. The position of the bores on the movable disk can be related to those of another pair by the rotation of a predetermined angle around the center of the disk. The support features means for the simultaneous insertion, across the two disks, of two expandable rings having a diameter which—when the rings are expanded—is at least that of the bores, as well as means for expanding said rings. The expansion returns the stationary and movable disks to a position in which one pair of bores in the movable disk is precisely coaxial with the bores in the stationary disk. Said expandable rings are mounted so as to move along their axes in front of the bores of the support; means are provided for introducing them, at will, in the bores and for causing their expansion, as well as for retracting them. Means are advantageously provided for pressing the head against the support after indexing.

Thus, by combining the rotation on plane disks, perpendicular to the axis of rotation, with centering clearance; and by indexing through a pair of expandable rings, introduced in one or more pairs of bores of the movable disk, in precise correspondence (of diameter and distance) with the bores of the stationary disk, one achieves a number of precise indexations, in as many predetermined angular positions as there are pairs of bores on the movable disk, without the need to provide, at the manufacturing stage, rigorous precision, except for the equality of the diameters and of the distances that separate the bores of the same pair; this may be attained by the simultaneous piercing of the stationary and movable disks.

The following provisions are preferably, but not necessarily, adopted according to the invention:

the two bores of the stationary disk, as well as the bores of the movable disks, have the same diameter; and a pair of bores in the movable disk shares a common bore with another pair of bores in the movable disk. The bores in the movable disk are located on at least some of the vertices of a polygon centered on the axis of rotation of the movable disk.

When the desired rotation is 180°, the preferred arrangement is where the bores in the stationary disk are located across a diameter of the disk, and where the movable disk likewise features a single pair of diametrically opposed bores.

The simultaneous piercing of the two bores in two superposed disks is an operation which can be carried out in a simple manner, with great precision; the agreement of these bores, after rotation of one of the disks, ensures the absolute geometric exactness at 180° of that rotation, around an axis of rotation located midway between the axes of the two bores. By providing that the rotation of the disks be effected by centering means that features a predetermined sufficient clearance, it is no longer necessary to determine precisely the axis of rotation, and the 180° angle is obtained with maximum rigor, by the coincidence of the bores of the disks.

The following arrangements may also advantageously be utilized:

(a) The expandable rings may be mounted at the end of the rods of two hydraulic rams, and the rams may be mounted in the support, concentrically with the indexing bores of the stationary disk.

(b) The expandable rings may be internally in the shape of truncated cones, being mounted on parts shaped like truncated cones, carried by the rods of the rams. Stops may be provided in order to arrest the forward travel of the rings, before the end of the stroke of the rods that carry the rings.

(c) The stops for the rings may be carried by a rod that slides through the pistons of the rams. The rear end of the rod may carry a collar that at the end of the stroke operates in conjunction with a stop carried by the ram cylinder.

(d) The outside diameter of the free expandable rings (before expansion) is advantageously chosen to avoid friction between the expandable rings and the indexing bores, during the insertion of the rings in the bores, for a maximum deviation from concentricity of the bores, equivalent to the maximum deviations from precision, carried out on the machined parts.

(e) The bores of the stationary and movable disks may carry cylindrical sleeves made of tempered steel, designed to receive the expandable rings.

(f) The expandable rings may be equipped with longitudinal slots, starting alternately from one end of the ring and then the other, over a length greater than the half-length of the rings.

(g) For a 180° rotation, the stationary and movable disks may carry, on their sliding plane, protruding parts that form end of rotation stops, located so as to allow the movable disk to effect a rotation slightly greater than 180°, each switch acting when the stops of the disks are separated by a short distance and causing the rotation of the head to slow down.

(h) Two end of travel switches may be located in the support, corresponding to the two positions at 180°, each switch acting when the stops of the disks are separated by a short distance and causing the stoppage of the device controlling the rotation of the head.

(i) After a time delay, the control device of head rotation may again be actuated and the movable disk again rotated until contact is made with the stationary stop.

(j) The actuation of an end of rotation switch may cause the insertion of the expandable rings in the bores of the disks after a time delay.

(k) When the rods of the rams reach the ends of their travel, causing insertion of the expandable ring, a switch may be triggered, causing rotation of the head to stop, and causing the head to be locked, while the retraction of the expandable rings out of the bores acts on an electric switch that causes the rotary head to unlock and authorizes the head to rotate.

(l) An annular ram, supplied with hydraulic pressure, may insure that the head is locked on its support with a force greater than the force components generated by machining stresses; a check valve located on the supply line of the ram can ensure the maintenance of that pressure, in case of failure of the hydraulic circuit.

(m) The rotation of the head may be controlled by a hydraulic motor and a reduction gear that drives a pinion acting on a ring gear carried by the head.

The invention is described in greater detail below, with references to attached drawings, in which there are represented, in FIGS. 1 to 6, a preferred embodiment of the invention with a single-spindle head with a rotation of 180°.

FIG. 2 is a detailed view, in a section along C—C, of FIG. 3, of the indexing means with an expandable ring, according to the invention.

FIG. 3 is a view along A—A of FIG. 1.

FIG. 7 represents the diagram of the stationary and movable disks of a variant of the invention.

FIG. 8 represents a diagram of the stationary and movable disks according to the invention, in an embodiment in which there are provided three indexing positions, 120° apart.

Figure 1:
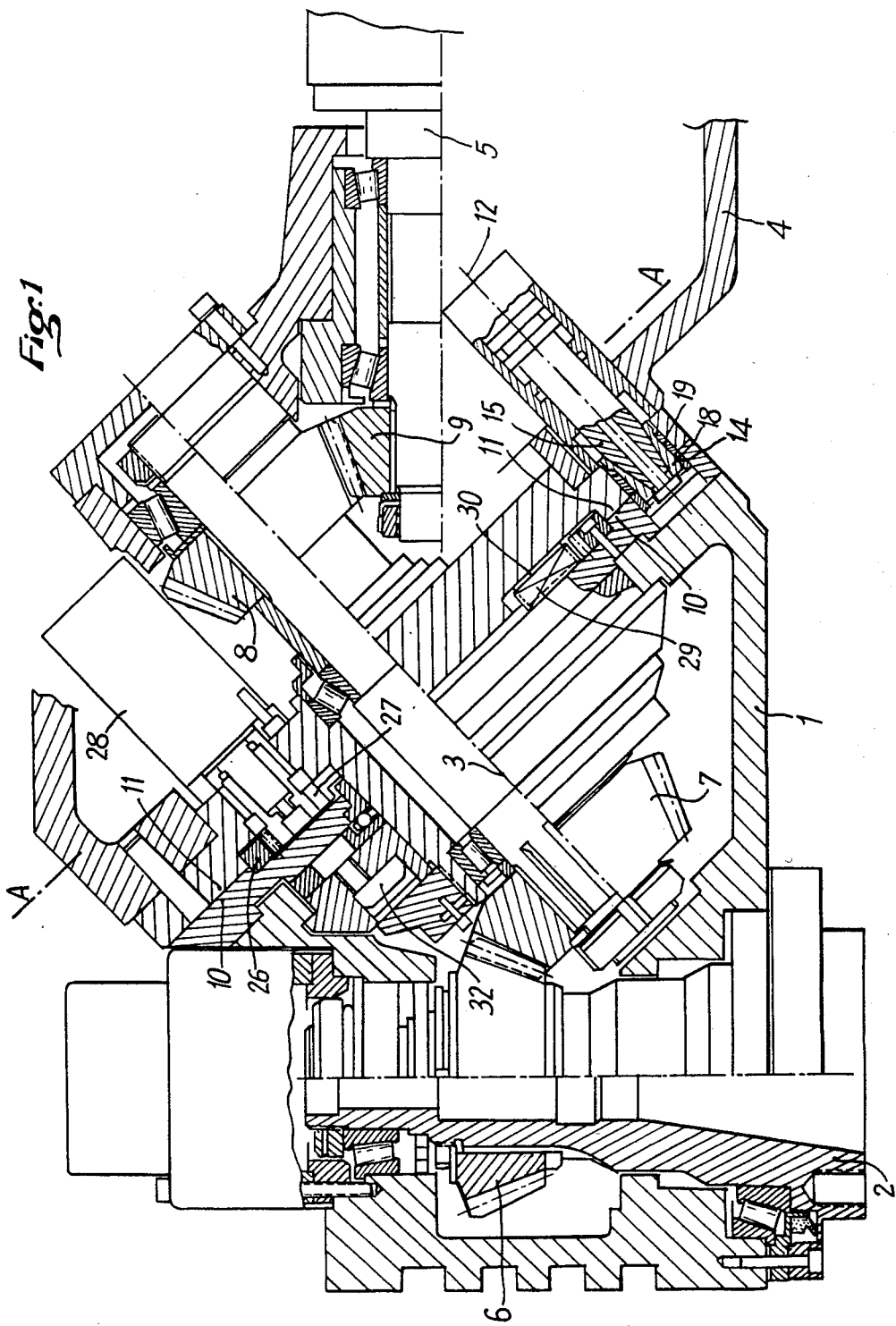
FIG. 1 is a partial schematic section along B—B, of FIG. 3, of the entirety of the head and its support.

The embodiment represented in FIGS. 1 to 6 refers to a single-spindle head, of the Hure Universal Head type, in which the spindle is in the working position, no matter what its orientation in relation to the head-bearing support or carriage. However, this design is applicable both to a single-spindle swiveling head of another type and to a multispindle head, such as the one described in U.S. Pat. No. 3,238,615, and can be used no matter what the angle of the inclination or of the axis of rotation of the head in relation to the horizontal.

In the example shown in FIGS. 1 to 6, this angle of inclination is 45°; the rotation necessary to change from the horizontal position of the spindle to its vertical position must be exactly 180°.

In the figures, it can be seen that head 1, carrying spindle 2, swivels along axis 3 on support or carriage 4. Spindle 2 is driven from a main shaft 5, by pinions 6, 7, 8, 9, in known fashion.

According to the invention, head 1 swivels on support 4, along a plane face 10, in the shape of an annular disk, perpendicular to axis 3, which slides on plane face 11, that is carried by the support and is also in the shape of an annular disk perpendicular to axis 3.

In the course of manufacture, disks 10 and 11 are pierced simultaneously with two bores of diametrically opposite axes, 12 and 13, and of equal diameters. As a consequence of this simultaneous piercing of the two disks, one obtains a rigorous coincidence of the bores, after swiveling of 180° exactly of the movable disk, provided the means of rotation and of centering of disks 10 and 11 leave sufficient clearance, and provided the precise indexing is carried out by making the bores coincide coaxially.

Making them coincide in this fashion is carried out by means of the expandable rings 14 which, at the end of the rotation of movable disk 10, are inserted in the bores and expanded.

In FIGS. 1 and 2 of the example shown, expandable rings 14 are carried by the end of rods 15 of two hydraulic rams 16, mounted on support 4, concentrically with the indexing bores 12, 13 of the stationary disk.

Referring to FIG. 2, it can be seen that end 17 of the ram is conical and that ring 14 is internally conical; preferably, bores 12a (stationary disk) and 12b (movable disk) are themselves equipped with rings 18, 19, of tempered steel, adjusted without strain and immobilized, whose internal diameters have been precision-ground together.

After ring 14 has been inserted by ram 16 in its indexing position, its advance is arrested by stop 20, carried by rod 21, which traverses piston 22 and bears on its rear section a collar 24 which, at the end of the travel, operates in conjunction with the shoulder 25 of cylinder 16, which forms a stop. The continuing advance of piston 22 then causes a penetration of cone 17 into ring 14 and the latter's expansion, which ensures precise indexing, by the coincidence of the bore axes 12a and 12b.

This assumes, however, that the indexing disks 10 and 11 are maintained concentric during the rotation of the head, through means of rotation and centering whose clearance is sufficient not to undo the return to position obtained by the expandable rings. The implementation of this characteristic is within the capability of those skilled in the art, using known means of transmission, whose clearance can be predetermined.

In the example shown, the transmission adopted is of the type in which a ring gear 26, carried by the movable disk 10, is driven by pinion 27, driven by hydraulic motor 28.

According to the invention, disks 10 and 11 carry, on their sliding plane, protruding parts 29, 30 which form end of rotation stops and which are placed so as to permit movable disk 10 to rotate slightly more than 180°, in a manner such that the stops, making contact, are separated as an effect of the precise return to position, obtained by rings 14.

Kinetic energy and passive resistance determine the position and the stoppage time of the head. After a time delay of about 0.15 seconds, the device that controls the rotation of the head is actuated again, and the movable disk that is integral with the head is driven in rotation until contact with the stationary stop is made. The position of the electric switch on the travel of the movable disk is calculated in a manner such that, under the effect of low passive resistance, the kinetic energy of the head at the moment of contact of the stops of mechanical end-of-rotation is negligible; while, under the effect of maximum passive resistance, the stoppage of the head shall be produced by a separation of the mechanical stops that shall be smaller than the distance required to accelerate the head to the velocity equivalent to the capacity of the control drive.

Actuation of the electric end-of-rotation switch authorizes, after a time delay, the insertion of the expandable rings in the bores of the disk. Actuation of the electric end-of-travel switch informs the control device of the machine of the horizontal or vertical position of the spindle.

The ends of the travels of rams 16 are detected by electric switches 31, which authorize:

when the expandable rings are inserted in the bores,
(a) stoppage of the head-rotation control
(b) locking of the head;

when the expandable rings are removed from the bores,
(a) unlocking of the head
(b) the command to rotate the head.

A combination of springs keeps the indexing disks in contact, during the rotation of the head, with a force greater than the component forcing the disks apart, which is caused by the weight of the head and of the tool.

An annular ram 32, supplied with hydraulic pressure, ensures—when the indexing is carried out by rings 14—that the head is locked on the machine's head-carrying carriage with a force greater than the force components generated by machining stresses.

Figure 4:
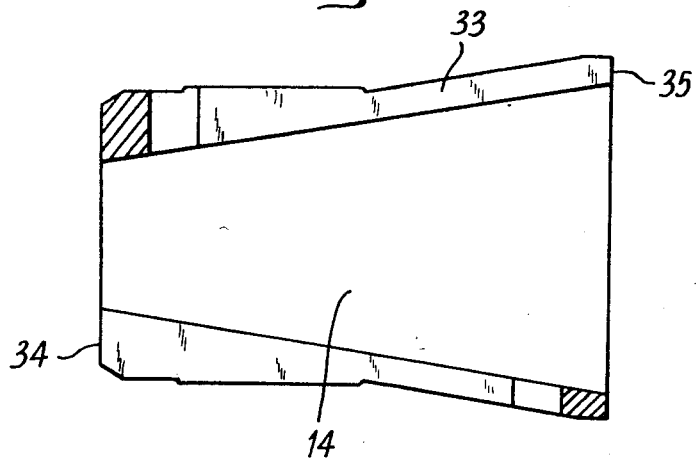
FIGS. 4, 5 and 6 illustrate, in axial section and in end view, an expandable ring.
Figure 5:
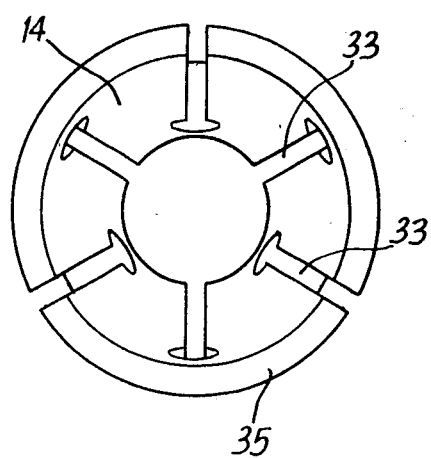
Figure 6:
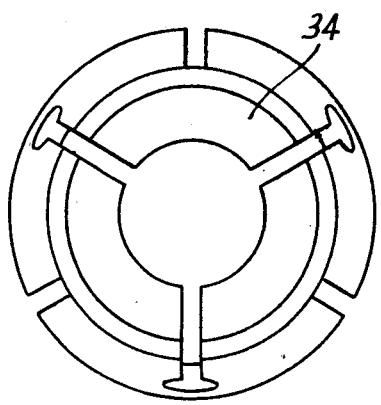

The expandable rings are preferably made as shown in FIGS. 4, 5 and 6—i.e., with longitudinal slots 33, distributed over their periphery, with a length greater than half the length of the ring, and made starting alternately from one or the other of ends 34, 35 of the ring.

As shown in FIG. 7, the invention is not limited to the case in which the desired indexation is equivalent to two positions 180° apart. Any angular distance between two indexing positions can be adopted, and the number of positions can be determined at will. According to one aspect of the invention, the stationary disk 11 carries two bores 12, 13 and the movable disk 10 carries as many pairs of bores 121 and 131, 122 and 132, 123 and 133, as there are desired indexing positions.

The two bores of each of these pairs have precisely the same diameters $d_{12}$, $d_{13}$ as the corresponding bores 12, 13 and the distance between centers D, separating them, is precisely the same as that of bores 12, 13. Their distance from the center $C_{10}$ is equal to the distance of bores 12, 13 from center $C_{11}$, within the limits of the clearance provided. The geometrical positions of the bores in a pair, such as 121, 131, are generated from those of another pair 122, 132 or 123, 133, by a rotation equivalent to the desired angular distance between the indexing positions. Movable disk 10 is driven in rotation through means that ensure the centering of disk 10 in relation to disk 11, with above-mentioned clearance. In front of each bore 12, 13, the support of the head features a means that allows inserting and expanding an expandable ring, as described and shown with reference to FIGS. 1 to 6.

Thus, precise indexing is obtained by the positioning and expansion of the rings; due to the clearance provided in the drive control of disk 10, the latter is returned to a position equivalent to precise coaxiality of one of pairs 121, 131 or 122, 132 or 123, 133 with the pair 12, 13.

FIG. 8 shows a diagram of the bores of the stationary and movable disks, for a case in which the desired indexing positions are 120° apart.

In this example, the pairs 121, 131, on one hand, and 122, 123, on the other, are superposed, in the sense that each of the bores of disk 10 belongs to two pairs, as shown. In that case, bores 12, 13 of stationary disk 11 have precisely the same diameter, as have all the bores of movable disk 10.

Other provisions may be adopted.

In the case of the examples in FIGS. 7 and 8, the end of rotation of the head, from one position to another, could be determined by electrical position-detectors, of which one stops the rapid rotation, while the other ensures precise stopping, before the expandable rings begin to operate. Any other device to detect the angular position, for the purpose of controling stoppage of the rotation, can be adopted.

The provisions of the invention apply in particular to machines that feature a tool changer, for which machines the movable head must be endowed with precise indexing positions both for the working positions and for the tool-changing positions.

I claim:

1. In a machine tool of the type having a spindle-carrying head which swivels on a support about an axis of rotation, the combination for achieving precise rotational orientation of said head, comprising:

a planar bearing surface on the head having at least one pair of diametrically opposed head bores;

a planar bearing surface on the support having a pair of diametrically opposed bores with diameters and center-to-center separations identical to those of each of the pairs of head bores;

means for rotatably coupling the head and support for relative rotation so that the head bearing surface slides against the support bearing surface during rotation and is rotatable thereon and being centered therein with a predetermined clearance;

an expandable ring member dedicated to each support bore, each ring having an expanded state and a contracted state, the exterior diameter of said ring being at least equal to the internal diameter of the respective bore in the expanded state and being less than said internal diameter in the contracted state; and means for mounting each of said ring members for translational movement within and between the respective support bore and a head bore aligned therewith, said ring members being contracted during said movement and being expanded while within aligned support and head bores to compensate for said clearance and locate said head with respect to said support within the limits of said clearance.

2. The machine tool of claim 1, further comprising means for pressing the head against the support in a manner that the head is locked into position and prevented from movement during machining.

3. The machine tool of claim 2, wherein said means for pressing operates on hydraulic pressure supplied by a hydraulic supply line.

4. The machine tool of claim 3, further comprising a check valve located in the supply line.

5. The machine tool of claim 1, further comprising a ring gear mounted to the head, a gear transmission connected to the ring gear, and a motor connected to the gear transmission and, when operated, causing the head to swivel on the support.

6. The machine tool of claim 5, wherein the motor is a hydraulic motor.

7. The machine tool of claim 1, wherein said mounting means comprises two rams, each mounted to the support concentrically with a corresponding support bore and attached to a corresponding one of the ring members.

8. The machine tool of claim 7, wherein each ram comprises a rod having an end at which an expanding element is attached and wherein the expanding element is received inside a corresponding one of the ring members.

9. The machine tool of claim 8, wherein each ring member has an interior in the shape of a truncated cone, each expanding element is in the shape of a truncated cone, and includes a stop associated with each ring member and supported on said rod to arrest its movement into its intended head bore prior to cessation of motion of its corresponding rod said rod sliding inside a piston associated with said ring, said stop further including a collar, said ram further having a cylinder therein and a stop within said cylinder, said collar being stopped by said ram stop.

10. The machine tool of claim 8, wherein each expandable ring member is unitary with longitudinal slots.

11. The machine tool of claim 10, wherein each of the longitudinal slots is longer than one-half the length of the ring member and wherein the slots alternate from one end of the ring member to the other end thereof.

12. The machine tool of claim 1, wherein the ring members can enter the head bores when the ring members are in the contracted state without touching the head.

13. The machine tool of claim 1, wherein a tempered sleeve is received in each of the head bores.

14. The machine tool of claim 1, wherein there is at least one head bore which is common to two pairs of head bores.

15. The machine tool of claim 14, wherein each of the head bores lies on a vertex of a regular polygon centered on the axis of rotation of the head.

16. The machine tool of claim 1, wherein there is exactly one pair of head bores and the head swivels between only two indexing positions.

17. The machine tool of claim 16, further including end of rotation stops which cooperate with the head and the support in a manner that the head can only swivel slightly more than 180° with respect to the support.

18. The machine tool of claim 17, further including two end of rotation switches, each corresponding to one of the indexing positions and adapted to cause at least a deceleration of the head when an indexing position is approached.

19. The machine tool according to claim 16 made by the process comprising the step of piercing said head and said support simultaneously to produce said bores.

20. The machine tool of claim 18, wherein the end of rotation switches are further adapted to cause advance and expansion of the ring members after the lapse of a predetermined time delay.

21. The machine tool of claim 2, further comprising means for cooperating with the mounting means and the means for pressing to cause the head to stop swiveling and to lock the head in position when the ring members are advanced into the head bores and expanded and to cause the head to be unlocked and to begin swiveling when the ring members are withdrawn from the head bores.

22. In a machine tool of the type having a spindle-carrying head which swivels on a support about an axis of rotation, the combination for achieving precise rotational orientation of said head, comprising:
a plane bearing surface on the head having a plurality of head bores in a predetermined pattern;
a plane bearing surface on the support having a plurality of bores constructed, as to their diameters, their center-to-center spacing, and their distance from said axis of rotation, so that at least two support bores align with respective head bores in at least two different rotational positions of the head;
means mounting said head for rotation with respect to said support so that said head bearing surface slides against said support bearing surface during rotation, said mounting means being constructed to provide a predetermined amount of movement normal to said axis of said head with respect to said support; and
at least two expandable ring members dedicated to support bores which align with head bores, each ring member having an expanded state and a contracted state, the exterior diameter of each said ring member being at least equal to the internal diameter of the respective bore in the expanded state and being less than said internal diameter in the contracted state to compensate for said clearance and locate said head with respect to said support within the limits of said clearance.

23. A machine tool in accordance with claim 22 further comprising means mounting each of said ring members for translational movement within said between the respective support bore and the head bore aligned therewith, said ring members being contracted during said movement and being expanded while within aligned support and head bores to achieve a precise rotational orientation of said head with respect to said support.

24. The machine tool according to claim 16, further including end of rotation stops which cooperating with the head and the support in a manner that the amount the head can swivel is limited thereby; and
two end of rotation switches, each corresponding to one of the indexing positions and adapted to cause at least a deceleration of the head when the index position is approached;
wherein each end of rotation switch is adapted to cause the head to slow down when approaching an indexing position to overshoot the indexing position to gently contact the end of rotation stops and to return to the indexing position upon expansion of the ring members.

* * * * *